(12) United States Patent
Zhou et al.

(10) Patent No.: US 10,332,449 B2
(45) Date of Patent: Jun. 25, 2019

(54) METHOD FOR POWERING ORGANIC ELECTROLUMINESCENCE DISPLAY PANEL, AND DISPLAY DEVICE

(71) Applicant: SHANGHAI TIANMA AM-OLED CO., LTD., Shanghai (CN)

(72) Inventors: Jingxiong Zhou, Shanghai (CN); Ruiyuan Zhou, Xiamen (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 15/788,659

(22) Filed: Oct. 19, 2017

(65) Prior Publication Data

US 2018/0308425 A1    Oct. 25, 2018

(30) Foreign Application Priority Data

Apr. 24, 2017    (CN) .......................... 2017 1 0272173

(51) Int. Cl.
  *G09G 3/3233*    (2016.01)
  *G09G 3/3291*    (2016.01)
  *H02M 3/158*    (2006.01)

(52) U.S. Cl.
  CPC ......... *G09G 3/3233* (2013.01); *G09G 3/3291* (2013.01); *G09G 2300/0408* (2013.01); *G09G 2300/0452* (2013.01); *G09G 2310/0291* (2013.01); *G09G 2320/0233* (2013.01); *G09G 2320/0295* (2013.01);
  (Continued)

(58) Field of Classification Search
  CPC .......................... G09G 3/3291; G09G 3/3233; G09G 3/3696; G09G 2330/02; G09G 2310/0251; G09G 2330/028; G09G 2300/0819; G09G 2310/0248; G09G 2300/0866; H02M 3/1582
  See application file for complete search history.

(56) References Cited

U.S. PATENT DOCUMENTS 9,728,138 B2 *  8/2017  Kim .................... G09G 3/3233
2003/0011247 A1 *  1/2003  Kajiwara ................ G06F 1/263
                                                                  307/125
(Continued)

FOREIGN PATENT DOCUMENTS

CN          101425259 A      5/2009
CN          103035174 A      4/2013
(Continued)

*Primary Examiner* — Sanjiv D. Patel
(74) *Attorney, Agent, or Firm* — Alston & Bird LLP

(57) ABSTRACT

The application discloses a method for powering an organic electroluminescence display panel, and a display device. When an external compensation circuit is acquiring parameters of respective sub-pixels in a display area of the organic electroluminescence display panel, the display area is powered using a power-supply circuit in a driver chip at high conversion efficiency, and thus high power consumption, to thereby lower power consumption in a parameter acquisition stage. While the external compensation circuit is performing data compensation to the respective sub-pixels in the display area of the organic electroluminescence display panel, the display area of the organic electroluminescence display panel is powered using the power management chip at high conversion efficiency to thereby achieve low power consumption in the data compensation stage.

12 Claims, 11 Drawing Sheets

(52) U.S. Cl.
CPC .................. G09G 2320/0693 (2013.01);
G09G 2330/02 (2013.01); G09G 2330/021
(2013.01); G09G 2330/023 (2013.01); G09G
2380/02 (2013.01); H02M 3/1582 (2013.01)

(56) References Cited

U.S. PATENT DOCUMENTS

| | | | |
|---|---|---|---|
| 2005/0179039 A1* | 8/2005 | Nonaka | G02F 1/13454 257/72 |
| 2008/0252626 A1* | 10/2008 | Iida | G09G 3/3233 345/204 |
| 2014/0015823 A1* | 1/2014 | Suh | G09G 5/001 345/212 |
| 2014/0368416 A1* | 12/2014 | Gu | G09G 3/3233 345/78 |
| 2015/0187276 A1* | 7/2015 | Shim | G09G 3/3233 345/77 |
| 2016/0124491 A1 | 5/2016 | An et al. | |
| 2016/0260409 A1* | 9/2016 | Lin | G09G 3/20 |
| 2016/0275863 A1* | 9/2016 | Kimura | G09G 3/3233 |

FOREIGN PATENT DOCUMENTS

| | | |
|---|---|---|
| CN | 105243996 A | 1/2016 |
| CN | 105741785 A | 7/2016 |
| CN | 106157895 A | 11/2016 |
| KR | 20160027788 A | 3/2016 |

* cited by examiner

METHOD FOR POWERING ORGANIC ELECTROLUMINESCENCE DISPLAY PANEL, AND DISPLAY DEVICE

CROSS-REFERENCES TO RELATED APPLICATIONS

This application claims priority to Chinese patent application No. CN201710272173.2 filed on Apr. 24, 2017 and titled "METHOD FOR POWERING ORGANIC ELECTROLUMINESCENCE DISPLAY PANEL, AND DISPLAY DEVICE", which is incorporated herein by reference in its entirety.

FIELD

The present disclosure relates to the field of display technologies, and specifically to a method for powering an organic electroluminescence display panel, and a display device.

BACKGROUND

Unlike a traditional Liquid Crystal Display (LCD), no backlight module is required in an organic electroluminescence (e.g., Organic Light-Emitting Diode (OLED)) display to show an image because the OLED display characterized in self-electroluminescence includes a very thin organic material coating, which emits light when there is current passing it. Compared with the traditional LCD, the OLED display is made of a lighter-weighted and thinner material. In addition, it has a larger view angle, and low power consumption. Therefore OLED displays have been increasingly predominant in the field of display devices from its high-quality visual enjoyment among users.

At present, the organic electroluminescence display technology is widely accepted as a very promising panel display technology. The organic materials come from a number of raw material candidates. The organic electroluminescence can display a wide range of spectrum from blue to red light; light is emitted actively with high brightness; OLED also requires low drive voltage; its view angle is as wide as 160 degrees; the response speed is 1,000 times that of the liquid crystal display; and as said above, ultra-low weight and thickness, low power consumption, etc. are additional advantages.

In the organic electroluminescence light-emitting diode display panel, each sub-pixel to be lightened is current driven, and the display non-uniformity (Mura) phenomenon may occur on the display panel from non-uniform threshold voltage of a drive transistor in each sub-pixel, and drifting of the threshold voltage over time and temperature; and in order to alleviate the Mura phenomenon, a general solution at present is to perform data compensation to the respective sub-pixels by adding an external compensation circuit to the OLED display panel.

Although the Mura phenomenon can be alleviated by adding an external compensation circuit to the OLED display panel, the additional external compensation circuit may consume much power in the OLED display panel. Accordingly, reducing power consumption for external compensation is highly desirable.

SUMMARY

In view of this, embodiments of the application provide a method for powering an organic electroluminescence display panel, and a display device to reduce high power consumption in external compensation.

In order to attain this objective, an embodiment of the disclosure provides a method for powering an organic electroluminescence display panel, the method includes: powering a display area of the organic electroluminescence display panel by a power-supply circuit in a driver chip while an external compensation circuit acquires parameters of respective sub-pixels in the display area of the organic electroluminescence display panel; powering the display area of the organic electroluminescence display panel by a power management chip while the external compensation circuit performs data compensation to the respective sub-pixels in the display area of the organic electroluminescence display panel.

In another aspect, an embodiment of the disclosure further provides a display device including: an organic electroluminescence display panel including an external compensation circuit, a driver chip including a power-supply circuit, and a power management chip, wherein: the driver chip is arranged in a peripheral area of the organic electroluminescence display panel; the power management chip is arranged on a flexible circuit board, a printed circuit board, or a smart terminal main-board, connected with a binding area of the organic electroluminescence display panel; the power-supply circuit of the driver chip is configured to power a display area of the organic electroluminescence display panel while the external compensation circuit acquires parameters of respective sub-pixels in the display area of the organic electroluminescence display panel; the power managing chip is configured to power the display area of the organic electroluminescence display panel while the external compensation circuit is performing data compensation to the respective sub-pixels in the display area of the organic electroluminescence display panel.

Advantageous effects of the embodiments of the disclosure are as follows: in the method for powering an organic electroluminescence display panel, and the display device according to the embodiments of the disclosure, while the external compensation circuit are acquiring the parameters of the respective sub-pixels in the display area of the organic electroluminescence display panel, there is small current required for the light-emitting diodes and it will take a long period of time to acquire the parameters at this time, so the display area of the organic electroluminescence display panel is powered using the power-supply circuit in the driver chip at high conversion efficiency in place of the existing power management chip to power the display area of the organic electroluminescence display panel at low conversion efficiency, and thus high power consumption, to thereby lower power consumption in the parameter acquisition stage. While the external compensation circuit is performing data compensation to the respective sub-pixels in the display area of the organic electroluminescence display panel, there is large current required for the light-emitting diodes at this time, so the display area of the organic electroluminescence display panel is powered using the power management chip at high conversion efficiency to thereby achieve low power consumption in the data compensation stage. The different powering modes are applied respectively in the data compensation stage and the parameter acquisition stage while the external compensation circuit is operating, thus enabling power management at low consumption for external compensation.

DETAILED DESCRIPTION OF THE EMBODIMENTS

Particular embodiments of a method for powering an organic electroluminescence display panel, and a display device according to the disclosure will be described below in details with reference to the drawings.

Figure 1:
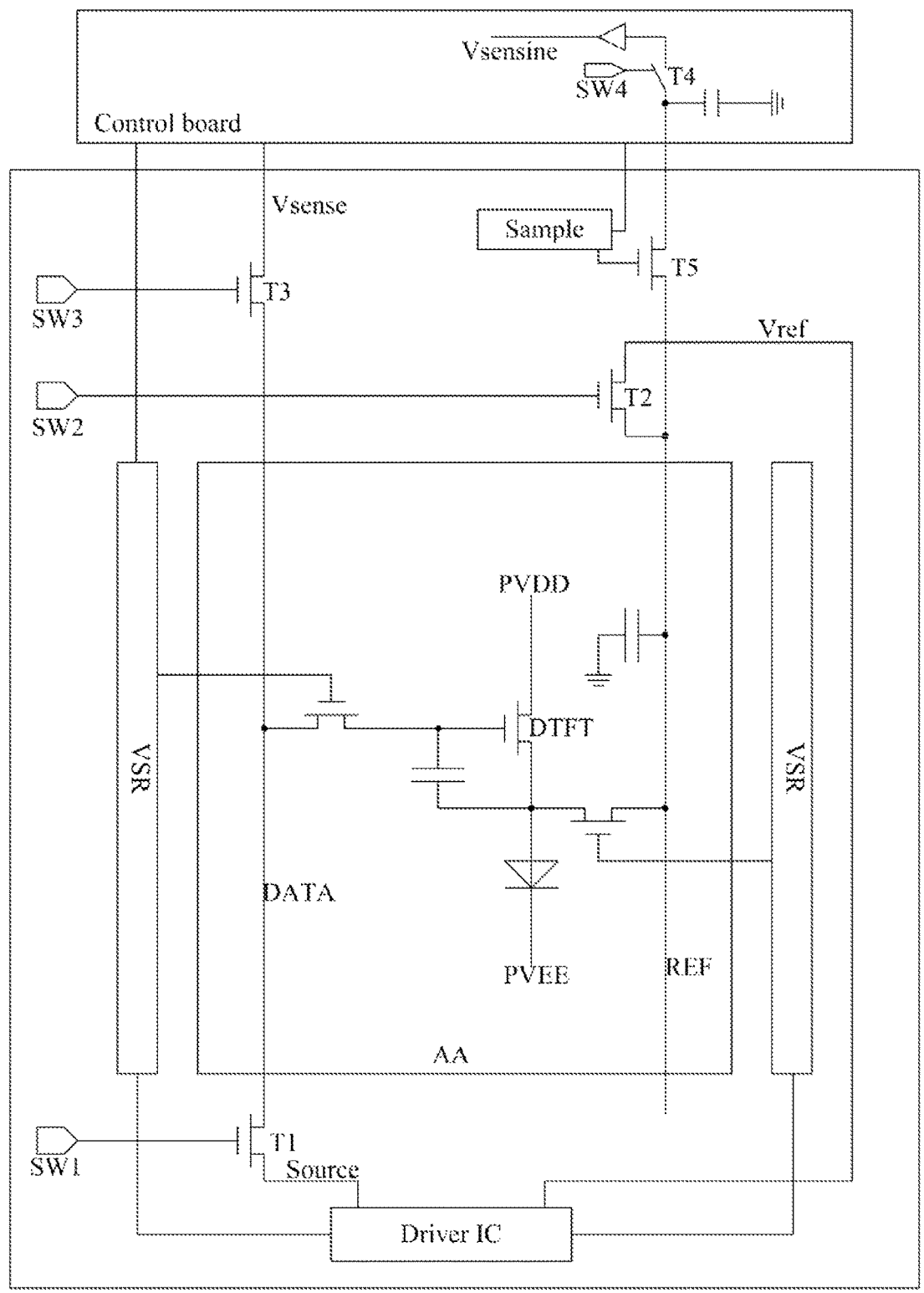
FIG. 1 is a schematic scheme diagram of a general OLED display panel including an external compensation circuit in the prior art.

At present, there are a number of schemes in which an external compensation circuit is added to an OLED display panel, and as illustrated in FIG. 1, for example, there is a standard 5-inch display panel (active area is 4.5-inch) which comes with a 540×960-pixel resolution, it has 540*960*3 sub-pixels for B, G, R three colors, where a sub-pixel circuit is illustrated in an Active Area (AA) in FIG. 1, for example. In a real application, each column of sub-pixel circuits corresponds to a data line (DATA) and a reference signal line (REF), and is connected respectively to a driver chip (Driver IC) and a control board.

In a normal display mode where there is no external compensation data, switch transistors T1 and T2 are controlled respectively by switches SW1 and SW2 connected therewith to be switched on so that a Source signal provided by the driver chip is written into the AA area over the data line, and a Vref signal provided by the driver chip is written into the AA area over the reference signal line.

After an external compensation mode is started, firstly the switch transistors T2 and T3 are connected by the switches SW2 and SW3 connected therewith to be powered on so that the Vref signal provided by the driver chip is written into the AA area over the reference signal line, and a Vsense signal provided by the control board is written into the AA area over the data line; and thereafter a switch transistor T5 is controlled by a parameter sampling unit Sample connected therewith to be switched on, and a switch transistor T4 is controlled by a switch SW4 connected therewith in the control board to be switched on, so that a sample data signal Vsensine flows into the control board over the reference signal line, and is converted from a digital signal into an analog signal in the control board, which is referred to as a parameter acquisition stage. Next after the acquired parameter is processed by the control board, the data compensation is performed while an image is being displayed, and at this time, the switch transistors T1 and T3 are controlled by the switches SW1 and SW3 connected therewith to be switched on, so that a data compensation signal provided by the control board is written into the AA area over the data line while the Source signal provided by the driver chip is being written into the AA area over the data line and displayed, thus finishing data compensation.

Figure 2:
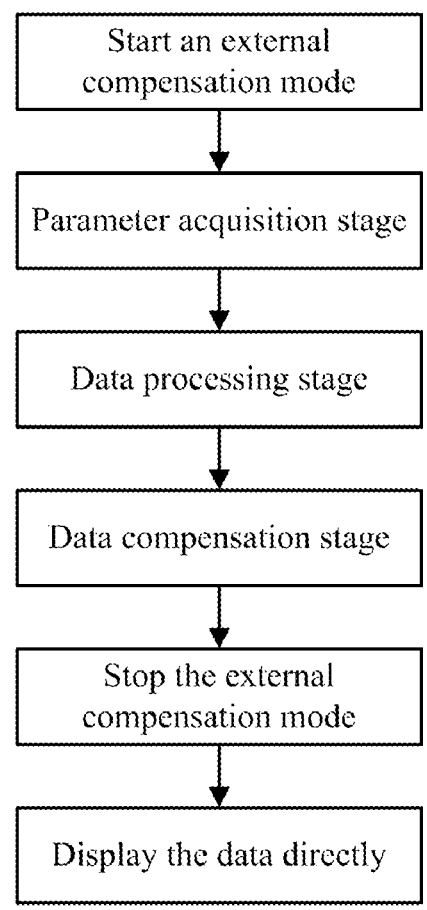
FIG. 2 is a schematic diagram of operating stages of the OLED display panel in the prior art.

The external compensation scheme in FIG. 1 as described above is only exemplary. Generally after the external compensation mode is started, a threshold voltage of a driver transistor (DTFT) in each sub-pixel, and relationship data of Vgs/Ids are tested, and the threshold voltage of the driver transistors, or Vgs difference at different current are compensated to on the data line, thus alleviating the problem of Mura arising from the non-uniform threshold voltage, and drifting of the threshold voltage over varying time and temperature. Accordingly as illustrated in FIG. 2, there are typically three stages including a parameter acquisition stage, a data processing stage, and a data compensation stage after the external compensation mode is started. The data is displayed directly after the external compensation mode is stopped.

In a particular implementation, the external compensation circuit needs to acquires a parameter of each sub-pixel, and the number of sub-pixels to be acquired at the same time is dependent upon the complexity of an acquisition circuit in the external compensation circuit, where the acquisition circuit will be more complex if there are a larger number of sub-pixels to be acquired at the same time, so for the sake of a lower cost, it is typical in a real operation to acquire parameter data of the respective sub-pixels in series, or to acquire parameter data of only several or a row of sub-pixels at a time. Thus it will take a long period of time to acquire the parameter data of the respective sub-pixels. Accordingly the parameters of only a part of the sub-pixels are acquired at a time, that is, only a part of light-emitting diodes operate, so there will be small current to be required for those light-emitting diodes.

Figure 3:
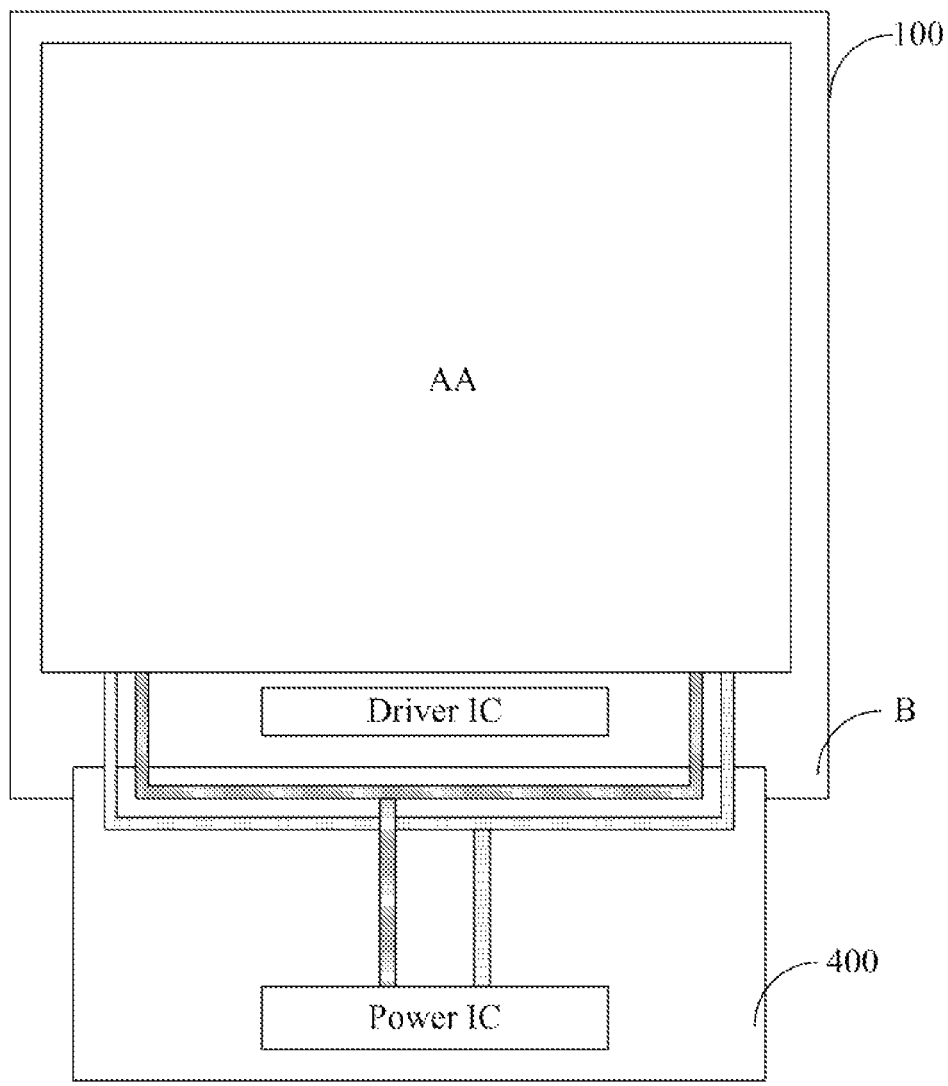
FIG. 3 is a schematic diagram of a power-supply structure of the OLED display panel in the prior art.

At present, as illustrated in FIG. 3, the organic electroluminescence display panel 100 including the external compensation circuit includes the driver chip (Driver IC) and the power management chip (Power IC) of a power-supply circuit, where the Driver IC is arranged in a peripheral area B of the organic electroluminescence display panel 100, and the Power IC is arranged on a flexible circuit board, a printed circuit board, or a smart terminal main-board represented as 400 in FIG. 3, connected with a binding area of the organic electroluminescence display panel 100.

While the OLED display panel is displaying normally, typically all the sub-pixels are operating at the same time, and there is large current required for the light-emitting diodes, and thus a large load of voltage to be applied to light-emitting layer anodes and cathodes of the light-emitting diodes, so they are typically powered by a single external power management chip (Power IC), specifically a Boost or buck circuit, to thereby guarantee high conversion efficiency so as to enable them to operate in a low power consumption state. In order to alleviate the Mura phenomenon using the external compensation circuit, there is small current required for the light-emitting diodes in the parameter acquisition stage, so if the powering mode of the existing OLED display panel is applied thereto, that is, the light-emitting layer anodes and cathodes of the light-emitting diodes are powered using the Power IC, then there may be low conversion efficiency in the Power IC, and thus high power consumption.

Figure 4:
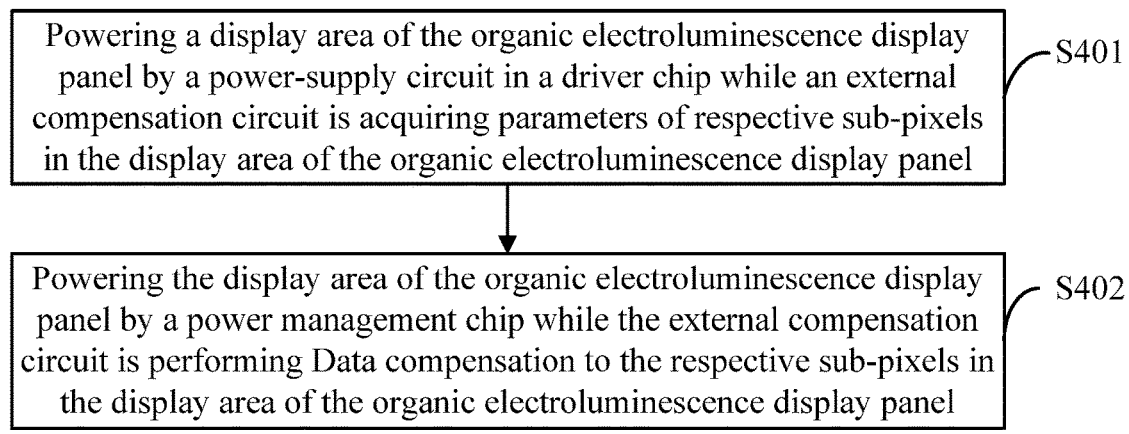
FIG. 4 is a first flow chart of a method for powering an organic electroluminescence display panel according to an embodiment of the disclosure.

In view of this, in order to address the problem of high power consumption for external compensation, an embodiment of the disclosure provides a method for powering an organic electroluminescence display panel as illustrated in FIG. 4, which can include the following steps.

The step S401 is to power a display area of the organic electroluminescence display panel using a power-supply circuit in a driver chip while an external compensation circuit is acquiring parameters of respective sub-pixels in the display area of the organic electroluminescence display panel.

The step S402 is to power the display area of the organic electroluminescence display panel using a power management chip while the external compensation circuit is performing the data compensation to the respective sub-pixels in the display area of the organic electroluminescence display panel.

Specifically in the method above for powering an organic electroluminescence display panel according to the embodiment of the disclosure, while the external compensation circuit is acquiring the parameters of the respective sub-pixels in the display area of the organic electroluminescence display panel, there is small current required for the light-emitting diodes (typically below 5 mA) and it will take a long period of time to acquire the parameters at this time, so it is innovative to power the display area of the organic electroluminescence display panel by arranging the power-supply circuit in the driver chip, where the power-supply circuit arranged in the driver chip is typically embodied as a charge pump to thereby guarantee high conversion efficiency, and the power-supply circuit is arranged in place of the existing power management chip to power the display area of the organic electroluminescence display panel to thereby avoid the problem of high power consumption due to low conversion efficiency so as to lower power consumption in the parameter acquisition stage. Moreover at this time the power management chip will be stopped from operating, but output in a high-resistance state to thereby stop being in a power-supply state for powering the respective sub-pixels in the display area of the organic electroluminescence display panel.

Furthermore in the method above for powering an organic electroluminescence display panel according to the embodiment of the disclosure, while the external compensation circuit is performing data compensation to the respective sub-pixels in the display area of the organic electroluminescence display panel, there is large current required for the light-emitting diodes (typically at the order of 100 mA) at this time, so the display area of the organic electroluminescence display panel is powered using the power management chip at high conversion efficiency to thereby achieve low power consumption in the data compensation stage. Furthermore at this time, the power-supply circuit in the driver chip will be stopped, but output in a high-resistance state to thereby stop being in a state for powering the respective sub-pixels in the display area of the organic electroluminescence display panel.

In summary, in the method above for powering an organic electroluminescence display panel according to the embodiment of the disclosure, the different power-supply modes are applied respectively in the data compensation stage and the parameter acquisition stage while the external compensation circuit is operating, thus enabling power management at low consumption for external compensation.

Specifically during external compensation on the organic electroluminescence display panel according to the embodiment of the disclosure, after the external compensation circuit acquires the parameters of the respective sub-pixels in the display area of the organic electroluminescence display panel, the external compensation circuit generally determines compensation data according to the acquired parameters in a specific algorithm, and then stores the compensation data into a chip memory (IC RAM), and thereafter the external compensation circuit performs data compensation to the respective sub-pixels in the display area of the organic electroluminescence display panel according to the determined compensation data. Stated otherwise, external compensation generally includes three periods of time for parameter acquisition, data processing, and data compensation. Generally there is a cycle of these three periods of time, and the data compensation is performed at the preset temporal cycle or under a preset triggering condition.

Figure 5:
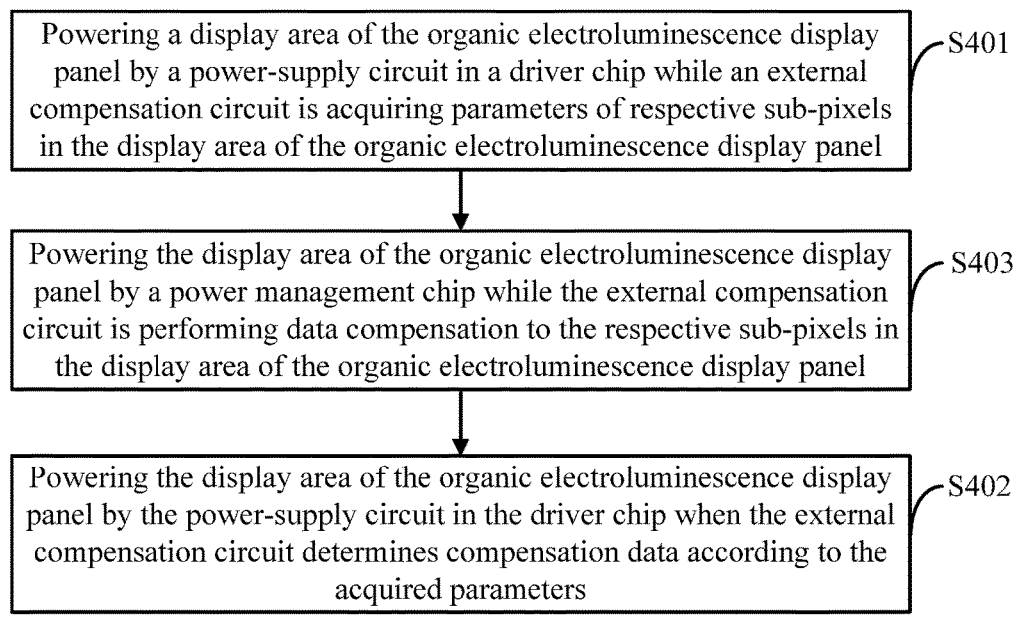
FIG. 5 is a second flow chart of a method for powering an organic electroluminescence display panel according to an embodiment of the disclosure.

Hereupon furthermore in a particular implementation, the method above for powering an organic electroluminescence display panel according to the embodiment of the disclosure can further include the following step as illustrated in FIG. 5 in connection with the external compensation mode.

The step S403 is to power the display area of the organic electroluminescence display panel using the power-supply circuit in the driver chip when the external compensation circuit determines compensation data according to the acquired parameters.

Specifically in the method above for powering an organic electroluminescence display panel according to the embodiment of the disclosure, after the external compensation circuit determines the compensation data according to the acquired parameters, there is small current required for the light-emitting diodes (typically below 5 mA), so the display area of the organic electroluminescence display panel is powered at high conversion efficiency using the power-supply circuit in the driver chip in place of using the existing power management chip to power the display area of the organic electroluminescence display panel at low conversion efficiency, and thus high power consumption, to thereby lower power consumption in the data processing stage. Moreover at this time the power management chip will be stopped from operating, but output in a high-resistance state to thereby stop being in a state for powering the respective sub-pixels in the display area of the organic electroluminescence display panel.

In a particular implementation, in the method above for powering an organic electroluminescence display panel according to the embodiment of the disclosure, a triggering condition for external compensation on the organic electroluminescence display panel is typically to control the external compensation circuit to acquire the parameters of the respective sub-pixels in the display area of the organic electroluminescence display panel while the organic electroluminescence display panel is being powered on, or at an interval of a preset time length between display periods two adjacent frames. Moreover at this time the power management chip will be stopped from operating, but output in a high-resistance state to thereby stop being in a state for powering the respective sub-pixels in the display area of the organic electroluminescence display panel.

Figure 6:
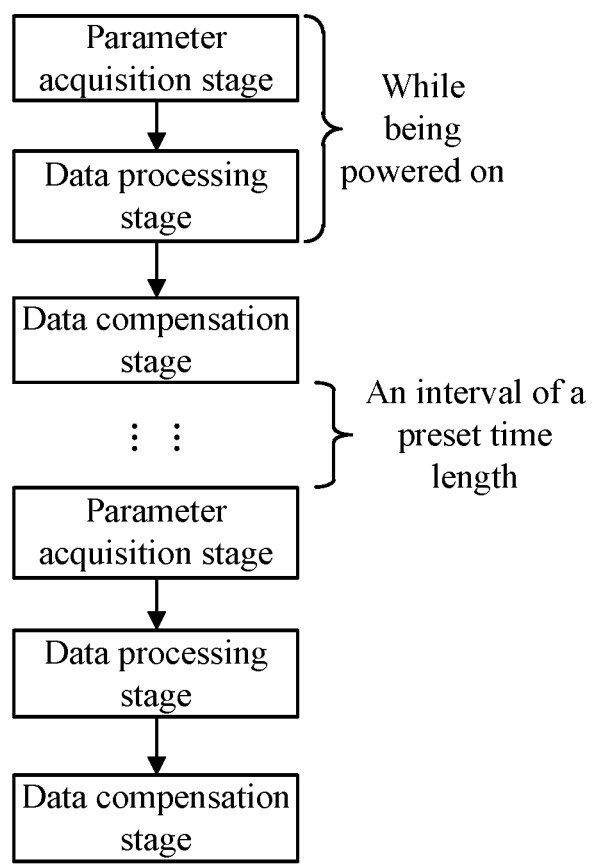
FIG. 6 is a first schematic timing diagram of triggering external compensation in an organic electroluminescence display panel according to an embodiment of the disclosure.

In a particular implementation, as illustrated in FIG. 6, firstly the parameter acquisition stage and the data processing stage can be performed while the display device is being powered on, and thereafter the data compensation stage can be performed after the display device is powered on, so that external compensation can be performed throughout the display process after the display device is powered on, to thereby prevent the Mura phenomenon from occurring on the display panel during a display stage after the display device is powered on, and moreover the parameter acquisition and data processing stages can be performed in synchronization with the display device being powered on, to thereby avoid a period of time from being taken before the data compensation stage. Furthermore in the subsequent display process, if there is a long display period of time, then the compensated parameters may not match with the current display condition, thus resulting in the Mura phenomenon. At this time, a counter can be configured to record an interval of time from last time of parameter acquisition, and if the interval of time satisfies a preset interval of time, e.g., one hour, then the external compensation circuit will be triggered to acquire the parameters of the respective sub-pixels in the display area of the organic electroluminescence display panel, and thereafter the data will be processed to update the compensation data, so that the respective sub-pixels are compensated with the updated compensation data to thereby alleviate the Mura phenomenon.

Specifically in the method above for powering an organic electroluminescence display panel according to the embodiment of the disclosure, preferably the organic electroluminescence display panel can further operate in a power-saving and screen-saving mode including a glance mode, a 1-bit mode, a 3-bit mode, etc., in which only a part of the sub-pixels in the display screen operate, and the operating sub-pixels display specific simple data and patterns, e.g., a clock, a date, weather, or another simple and fixed screen-saving pattern.

Specifically only a part of the sub-pixels in the organic electroluminescence display panel in a power-saving and screen-saving mode operate, so there is small current required for those light-emitting diodes, and if the light-emitting layer anodes and cathodes of the light-emitting diodes are powered using the power management chip, then there will be low conversion efficiency in the power management chip, and thus high power consumption; and if the organic electroluminescence display panel operates in the power-saving and screen-saving mode, then the display area of the organic electroluminescence display panel may be powered using the driver chip to thereby improve conversion efficiency so as to lower power consumption. Furthermore at this time the power management chip will be stopped from operating, but output in a high-resistance state to thereby stop being in a state for powering the respective sub-pixels in the display area of the organic electroluminescence display panel. Moreover in the power-saving and screen-saving mode, typically no external compensation is performed to thereby lower power consumption.

If the organic electroluminescence display panel can operate in a power-saving and screen-saving mode, then preferably in the method above for powering an organic electroluminescence display panel according to the embodiment of the disclosure, the condition for triggering external compensation on the organic electroluminescence display panel can further include: before the power-saving and screen-saving mode is started, the external compensation circuit is controlled to acquire the parameters of the respective sub-pixels in the display area of the organic electroluminescence display panel. Stated otherwise, as illustrated in FIG. 7 and FIG. 8, after it is determined that the power-saving and screen-saving mode needs to be started, firstly the parameter acquisition stage for external compensation is performed, and thereafter the power-saving and screen-saving mode is entered, so that the parameters can be acquired in a period of time before the power-saving and screen-saving mode is started, to thereby alleviate normal displaying from being affected by parameter acquisition for external compensation as much as possible.

Furthermore in a particular embodiment, in the method above for powering an organic electroluminescence display panel according to the embodiment of the disclosure, before the power-saving and screen-saving mode is started, or while the power-saving and screen-saving mode is being performed, the external compensation circuit can determine the compensation data according to the acquired parameters. Stated otherwise, as illustrated in FIG. 7, if it is determined that the power-saving and screen-saving mode needs to be started, then firstly the parameter acquisition stage and the data processing stage for external compensation will be performed, and thereafter the power-saving and screen-saving mode will be entered. Alternatively as illustrated in FIG. 8, if it is determined that the power-saving and screen-saving mode needs to be started, then firstly the parameter acquisition stage for external compensation will be performed, and thereafter the power-saving and screen-saving mode will be entered at the same time when the data will be processed, so that the parameters can be acquired in a period of time before the power-saving and screen-saving mode is started, or while the power-saving and screen-saving mode is being performed, to thereby alleviate normal displaying from being affected by data processing for external compensation as much as possible.

Figure 7:
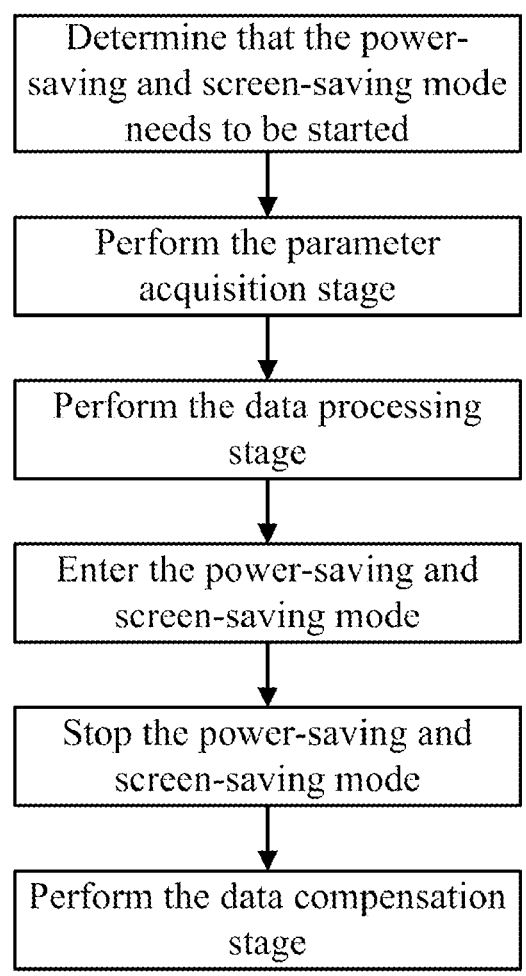
FIG. 7 is a second schematic timing diagram of triggering external compensation in an organic electroluminescence display panel according to an embodiment of the disclosure.
Figure 8:
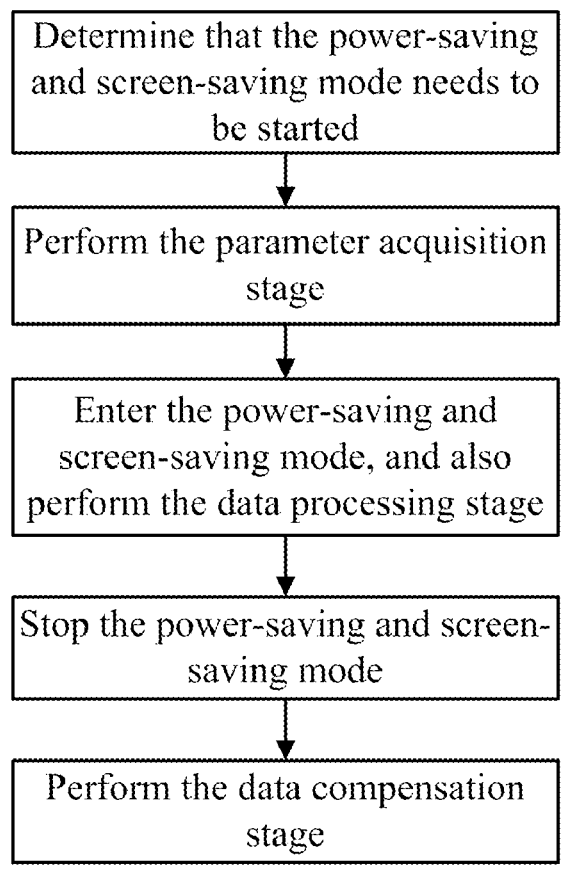
FIG. 8 is a third schematic timing diagram of triggering external compensation in an organic electroluminescence display panel according to an embodiment of the disclosure.

Furthermore in a particular implementation, in the method above for powering an organic electroluminescence display panel according to the embodiment of the disclosure, as illustrated in FIG. 7 and FIG. 8, after the power-saving and screen-saving mode is performed, the data compensation stage can be performed to control the external compensation circuit to compensate for the data of the respective sub-pixels in the display area of the organic electroluminescence display panel. Moreover at this time, the display area of the organic electroluminescence display panel is powered using the power management chip at high conversion efficiency to thereby lower power consumption in the data compensation stage. Also the power-supply circuit in the driver chip will be stopped from operating, but output in a high-resistance state to thereby stop being in a state for powering the respective sub-pixels in the display area of the organic electroluminescence display panel.

In a particular implementation, in the method above for powering an organic electroluminescence display panel according to the embodiment of the disclosure, the display area of the organic electroluminescence display panel can be powered using the power-supply circuit in the driver chip in a number of implementations in whichever of the parameter acquisition stage, the data processing stage, or the power-saving and screen-saving mode.

Specifically in the method above for powering an organic electroluminescence display panel according to the embodiment of the disclosure, the display area of the organic electroluminescence display panel is powered using the power-supply circuit in the driver chip in such an implementation that a positive voltage signal generated by the boost circuit arranged in the driver chip can be provided as voltage required for the anodes in the display area of the organic electroluminescence display panel; and also a negative voltage signal generated by the buck circuit in the driver chip can be provided as voltage required for the cathodes in the display area of the organic electroluminescence display panel.

In the method above for powering an organic electroluminescence display panel according to the embodiment of the disclosure, the voltage to be applied to the anodes and the cathodes in the parameter acquisition stage and the data processing stage can be produced by the boost circuit and the buck circuit in the driver chip to thereby improve conversion efficiency for boosting and bucking so as to lower power consumption in the parameter acquisition stage and the data processing stage.

Moreover typically in the parameter acquisition stage, the data processing stage, and the power-saving and screen-saving mode, the boost circuit and the buck circuit can provide a positive voltage signal and a negative voltage signal at the same amplitude, or can provide the positive voltage signal and the negative voltage signal at different amplitudes as needed, although the embodiment of the disclosure will not be limited thereto. Moreover in the parameter acquisition stage, the data processing stage, and the power-saving and screen-saving mode, the same boost circuit and buck circuit can provide a positive voltage signal and a negative voltage signal, or different boost circuits and buck circuits can provide a positive voltage signal and a negative voltage signal, although the embodiment of the disclosure will not be limited thereto.

Alternatively the display area of the organic electroluminescence display panel is powered using the power-supply circuit in the driver chip specifically in such another implementation that a positive voltage signal generated by the boost circuit arranged in the driver chip can be provided as voltage required for the anodes in the display area of the organic electroluminescence display panel; and also the cathodes in the display area of the organic electroluminescence display panel can be grounded.

In the method above for powering an organic electroluminescence display panel according to the embodiment of the disclosure, the voltage to be applied to the anodes in the parameter acquisition stage and the data processing stage can be produced by the boost circuit and the buck circuit in the driver chip to thereby improve conversion efficiency for boosting so as to lower power consumption in the parameter acquisition stage and the data processing stage.

Moreover typically in the parameter acquisition stage, the data processing stage, and the power-saving and screen-saving mode, the boost circuit can provide a positive voltage signal and a negative voltage signal at the same amplitude, or can provide the positive voltage signal and the negative voltage signal at different amplitudes as needed, although the embodiment of the disclosure will not be limited thereto. Moreover in the parameter acquisition stage, the data processing stage, and the power-saving and screen-saving mode, the same boost circuit can provide a positive voltage signal and a negative voltage signal, or different boost circuits can provide a positive voltage signal and a negative voltage signal, although the embodiment of the disclosure will not be limited thereto.

Those skilled in the art shall appreciate that the implementations described above in which the organic electroluminescence display panel is powered are only a part of implementations of the disclosure in which the organic electroluminescence display panel can be powered using the power-supply circuit in the driver chip, but in fact there may be also other implementations of the disclosure in which the organic electroluminescence display panel can be powered using the power-supply circuit in the driver chip, for example, a negative voltage signal produced by the buck circuit arranged in the driver chip can be provided as voltage required for the cathodes in the display area of the organic electroluminescence display panel; and also the anodes in the display area of the organic electroluminescence display panel can be grounded, particular as required in practice although the embodiment of the disclosure will not be limited thereto.

Preferably in a particular implementation, in the method above for powering an organic electroluminescence display panel according to the embodiment of the disclosure, the external compensation circuit can be controlled in the parameter acquisition stage specifically in the following implementations to acquire the parameters of the respective sub-pixels in the display area of the organic electroluminescence display panel.

The external compensation circuit is controlled to acquire the parameters, which are threshold voltage of driver transistors in the respective sub-pixels in the display area of the organic electroluminescence display panel so as to address the problem of non-uniform threshold voltage of the driver transistors in the respective sub-pixels in the display area of the organic electroluminescence display panel, and/or drifting of the threshold voltage over varying time and temperature, and/or; the external compensation circuit is controlled to acquire the parameters, which are current and voltage relationships of light-emitting diodes in the respective sub-pixels in the display area of the organic electroluminescence display panel so as to address the problem of varying drops of light-emission efficiency of the light-emitting diodes in the respective sub-pixels in the display area of the organic electroluminescence display panel over varying time and temperature.

It shall be noted that external compensation in the method above for powering an organic electroluminescence display panel according to the embodiment of the disclosure can involve external compensation for a drop of light-emission efficiency, and external compensation for drifting of threshold voltage of a driver transistor, or only external compensation for a drop of light-emission efficiency, or only external compensation for drifting of threshold voltage of a driver transistor, although the embodiment of the disclosure will not be limited thereto.

Specifically in the method above for powering an organic electroluminescence display panel according to the embodiment of the disclosure, the external compensation circuit can be controlled to acquire the parameters of the respective sub-pixels in the display area of the organic electroluminescence display panel, in a number of implementations. Specifically in order to lower the complexity of an acquisition circuit configured to acquire the parameters, and the IC cost of the driver chip, the external compensation circuit can be controlled to acquire the parameters of the respective sub-pixels in the display area of the organic electroluminescence display panel, typically in the following two implementations.

In a first implementation, the parameters of the respective sub-pixels in the display area of the organic electroluminescence display panel are acquired by acquiring the parameter of at least one sub-pixel at a time in series.

In a second implementation, the parameters of the respective sub-pixels in the display area of the organic electroluminescence display panel are acquired by acquiring the parameters of a row of sub-pixels at a time in series.

Generally the complexity of the acquisition circuit is dependent upon the number of sub-pixels for which the parameters need to be acquired at a time, and an analog-to-digital converter matching the number of sub-pixels for which the parameters need to be acquired at a time needs to be arranged in the acquisition circuit, so if the parameter of only one sub-pixel needs to be acquired at a time, then the structure of the acquisition circuit will be the simplest, but it will take the longest period of time to acquire the parameters in the corresponding parameter acquisition stage. Accordingly in a real operation process, the number of sub-pixels to be acquired at a time can be preset according to the number of sub-pixels in the organic electroluminescence display panel, and an acquisition period of time, although the embodiment of the disclosure will not be limited thereto.

Figure 9:
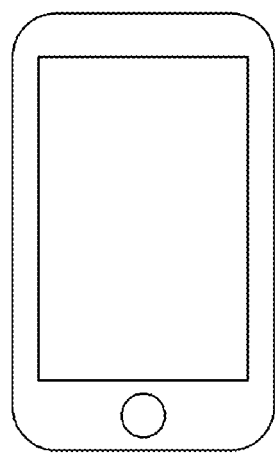
FIG. 9 is a schematic diagram of a display device according to an embodiment of the disclosure.

Based upon the same inventive idea, an embodiment of the disclosure further provides a display device as illustrated in FIG. 9, where the display device can be a mobile phone, a tablet computer, a TV set, a display, a notebook computer, a digital photo frame, a navigator, or any other product or component capable of displaying. Reference can be made to the embodiments of the organic electroluminescence display panel above for an implementation of the display device, so a repeated description thereof will be omitted here.

Figure 10:
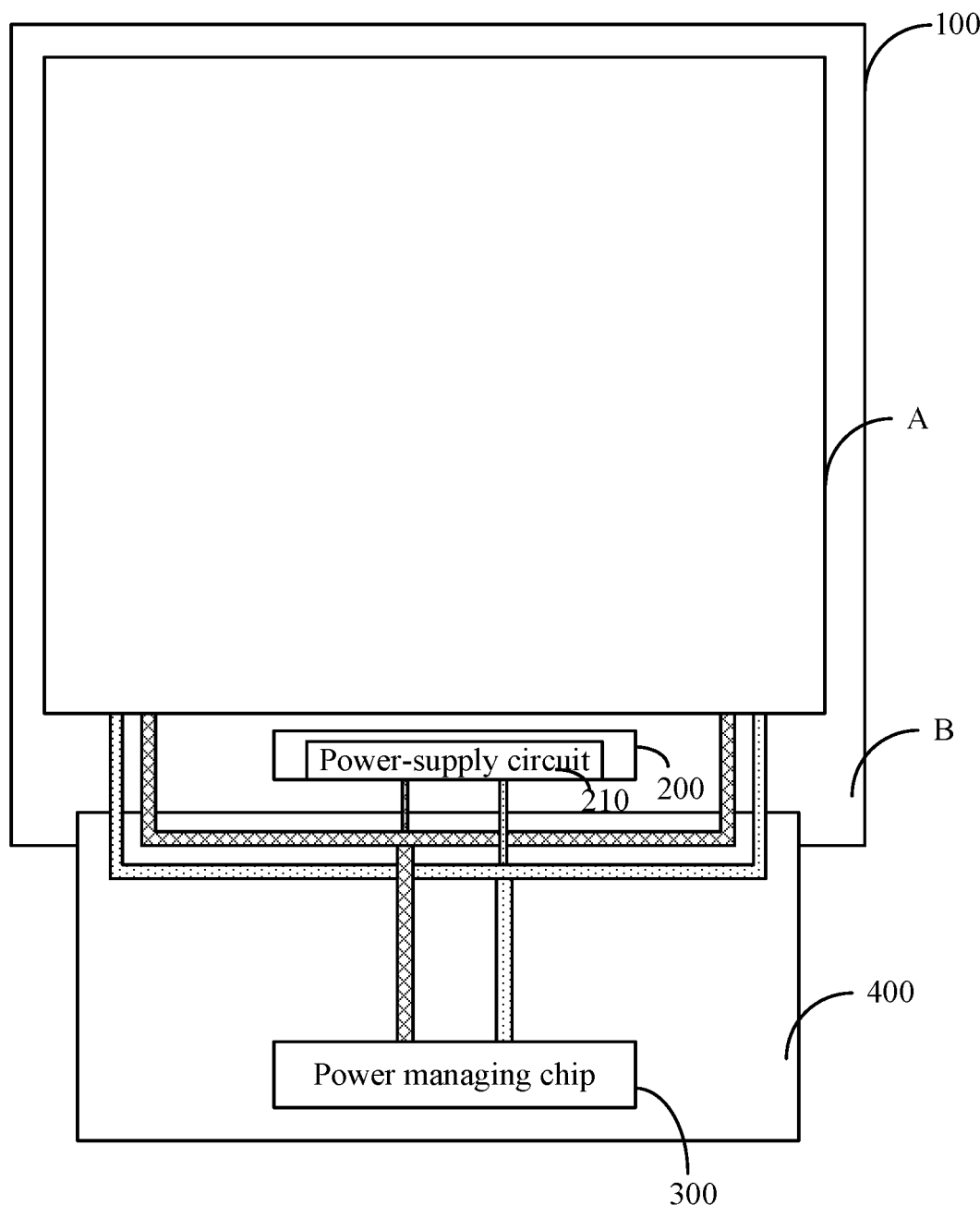
FIG. 10 is a schematic structural diagram of a display device according to an embodiment of the disclosure.

Specifically an embodiment of the disclosure provides a display device as illustrated in FIG. 10 including: an organic electroluminescence display panel 100 including an external compensation circuit, a driver chip 200 including a power-supply circuit 210, and a power management chip 300.

The driver chip 200 is arranged in a peripheral area B of the organic electroluminescence display panel 100.

The power management chip 300 is arranged on a flexible circuit board, a printed circuit board, or a smart terminal main-board represented as 400 in FIG. 10, connected with a binding area of the organic electroluminescence display panel 100.

The power-supply circuit 210 of the driver chip 200 is configured to power a display area A of the organic electroluminescence display panel while the external compensation circuit acquires parameters of respective sub-pixels in the display area A of the organic electroluminescence display panel.

The power managing chip 300 is configured to power the display area of the organic electroluminescence display panel 100 while the external compensation circuit is performing data compensation on the respective sub-pixels in the display area of the organic electroluminescence display panel 100.

In a possible implementation, in the display device according to the embodiment of the disclosure, the power-supply circuit 210 of the driver chip 200 is further configured to power the display area A of the organic electroluminescence display panel 100 when the external compensation circuit determines compensation data according to the acquired parameters.

Figure 11A:
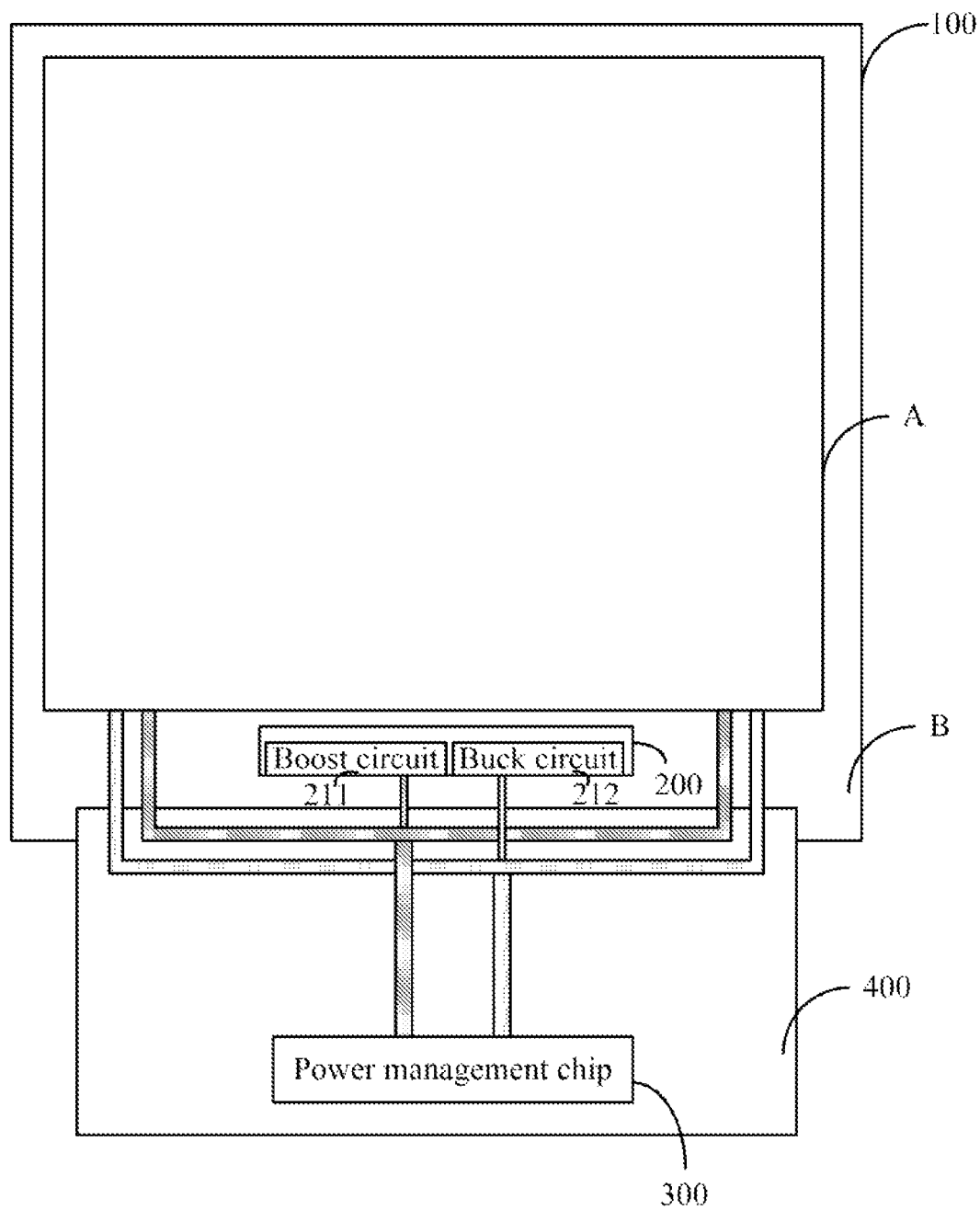
FIG. 11A and FIG. 11B are schematic of specific structural diagrams respectively of a display device according to embodiments of the disclosure.

In a possible implementation, in the display device according to the embodiment of the disclosure, as illustrated in FIG. 11A, the power-supply circuit 210 includes a boost circuit 211 and a buck circuit 212.

The boost circuit 211 is configured to produce a positive voltage signal to provide voltage required for anodes in the display area A of the organic electroluminescence display panel 100.

The buck circuit 212 is configured to produce a negative voltage signal to provide voltage required for cathodes in the display area A of the organic electroluminescence display panel 100.

Figure 11B:
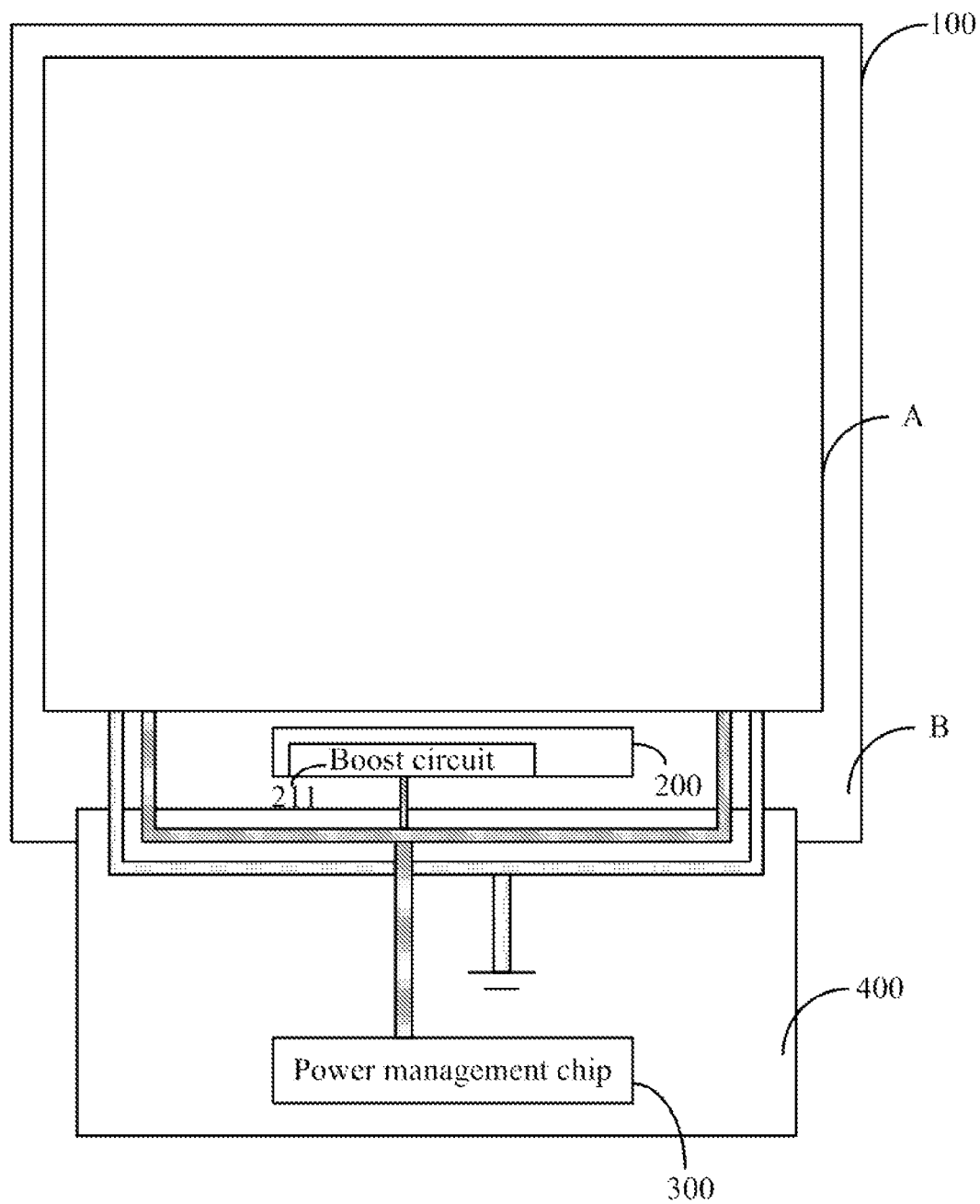

In a possible implementation, in the display device according to the embodiment of the disclosure, as illustrated in FIG. 11B, the power-supply circuit 210 includes: a boost circuit 211; and cathodes in the display area A of the organic electroluminescence display panel 100 are grounded.

The boost circuit 211 is configured to produce a positive voltage signal to provide voltage required for anodes in the display area A of the organic electroluminescence display panel 100.

Those skilled in the art can clearly appreciate from the foregoing description of the embodiments that the embodiments of the disclosure can be implemented in hardware or in software plus a necessary general hardware platform. Based upon such understanding, the technical solutions of the embodiments of the disclosure can be embodied in the form of a software product which can be stored in a nonvolatile storage medium (e.g., a CD-ROM, a U-disk, a mobile hard disk, etc.) and which includes several instructions to cause a computer device (e.g., a personal computer, a server, a network device, etc.) to perform the method according to the respective embodiments of the disclosure.

Those skilled in the art can appreciate that the drawings are merely a schematic diagram of preferred embodiments, and the module(s) or the flow(s) may not necessarily be required to implement the embodiments of the disclosure.

Those skilled in the art can appreciate that the respective modules in the device according to the embodiments of the disclosure can be distributed in the device according to the embodiments of the disclosure as described in the embodiments of the disclosure, or can be modified accordingly and be located in one or more different devices from the device according to the embodiments of the disclosure. The modules in the embodiments of the disclosure can be combined into a module, or can be subdivided into a plurality of sub-modules.

The embodiments above of the disclosure have been numbered only for the sake of a convenient description, but will not suggest any superiority of one embodiment to another.

In the method for powering an organic electroluminescence display panel, and the display device according to the embodiments of the disclosure, while the external compensation circuit are acquiring the parameters of the respective sub-pixels in the display area of the organic electroluminescence display panel, there is small current required for the light-emitting diodes and it will take a long period of time to acquire the parameters at this time, so the display area of the organic electroluminescence display panel is powered using the power-supply circuit in the driver chip at high conversion efficiency in place of the existing power management chip to power the display area of the organic electroluminescence display panel at low conversion efficiency, and thus high power consumption, to thereby lower power consumption in the parameter acquisition stage. While the external compensation circuit is performing data compensation on the respective sub-pixels in the display area of the organic electroluminescence display panel, there is large current required for the light-emitting diodes at this time, so the display area of the organic electroluminescence display panel is powered using the power management chip at high conversion efficiency to thereby achieve low power consumption in the data compensation stage. The different powering modes are applied respectively in the data compensation stage and the parameter acquisition stage while the external compensation circuit is operating, thus enabling power management at low consumption for external compensation.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

What is claimed is:

1. A method for powering an organic electroluminescence display panel comprising:
   powering a display area of the organic electroluminescence display panel by a power-supply circuit in a driver chip when an external compensation circuit is acquiring parameters of respective sub-pixels in the display area of the organic electroluminescence display panel, and
   powering the display area of the organic electroluminescence display panel by a power management chip while the external compensation circuit is performing data compensation to the respective sub-pixels in the display area of the organic electroluminescence display panel;
   wherein the powering a display area of the organic electroluminescence display panel by a power-supply circuit in a driver chip comprises:
   generating a positive voltage signal by a boost circuit in the driver chip as voltage required for anodes in the display area of the organic electroluminescence display panel; and
   generating a negative voltage signal by a buck circuit in the driver chip as voltage required for cathodes in the display area of the organic electroluminescence display panel;
   or
   generating a positive voltage signal by a boost circuit in the driver chip as voltage required for anodes in the display area of the organic electroluminescence display panel; and grounding cathodes in the display area of the organic electroluminescence display panel.

2. The powering method according to claim 1, wherein the method further comprises:
   powering the display area of the organic electroluminescence display panel by the power-supply circuit in the driver chip when the external compensation circuit determines compensation data according to the acquired parameters.

3. The powering method according to claim 1, wherein a power-saving and screen-saving mode of the organic electroluminescence display panel is powered by the driver chip.

4. The powering method according to claim 3, further comprising: controlling the external compensation circuit to acquire the parameters of the respective sub-pixels in the display area of the organic electroluminescence display panel before the power-saving and screen-saving mode starts.

5. The powering method according to claim 4, wherein determining compensation data by the external compensation circuit according to the acquired parameters takes place before the power-saving and screen-saving mode starts, or while the power-saving and screen-saving mode is performing.

6. The powering method according to claim 5, further comprising: controlling the external compensation circuit to perform data compensation to the respective sub-pixels in the display area of the organic electroluminescence display panel after the power-saving and screen-saving mode stops.

7. The powering method according to claim 1, wherein controlling the external compensation circuit to acquire the parameters of the respective sub-pixels in the display area of the organic electroluminescence display panel takes place when the organic electroluminescence display panel is powered on, or at an interval of a preset time length between display periods of two adjacent frames.

8. The powering method according to claim 1, wherein controlling the external compensation circuit to acquire the parameters of the respective sub-pixels in the display area of the organic electroluminescence display panel comprises:
   controlling the external compensation circuit to acquire the parameters, which are threshold voltage of driver transistors in the respective sub-pixels in the display area of the organic electroluminescence display panel; and/or
   controlling the external compensation circuit to acquire the parameters, which are current and voltage relationships of light-emitting diodes in the respective sub-pixels in the display area of the organic electroluminescence display panel.

9. The powering method according to claim 1, wherein controlling the external compensation circuit to acquire the parameters of the respective sub-pixels in the display area of the organic electroluminescence display panel comprises:
   acquiring the parameters of the respective sub-pixels in the display area of the organic electroluminescence display panel by acquiring the parameters of at least one sub-pixel at a time in series.

10. The powering method according to claim 1, wherein controlling the external compensation circuit to acquire the parameters of the respective sub-pixels in the display area of the organic electroluminescence display panel comprises:
    acquiring the parameters of the respective sub-pixels in the display area of the organic electroluminescence display panel by acquiring parameters of a row of sub-pixels at a time in series.

11. A display device, comprising: an organic electroluminescence display panel comprising an external compensation circuit, a driver chip comprising a power-supply circuit, and a power management chip,
    wherein the driver chip is arranged in a peripheral area of the organic electroluminescence display panel;
    wherein the power management chip is arranged on a flexible circuit board, a printed circuit board, or a smart terminal main-board, connected with a binding area of the organic electroluminescence display panel;
    wherein the power-supply circuit of the driver chip is configured to power a display area of the organic electroluminescence display panel while the external compensation circuit acquires parameters of respective sub-pixels in the display area of the organic electroluminescence display panel; and
    wherein the power management chip is configured to power the display area of the organic electroluminescence display panel when the external compensation circuit is performing data compensation to the respective sub-pixels in the display area of the organic electroluminescence display panel;
    wherein the power-supply circuit comprises a boost circuit and a buck circuit,
    wherein the boost circuit is configured to produce a positive voltage signal as voltage required for anodes in the display area of the organic electroluminescence display panel; and
    wherein the buck circuit is configured to produce a negative voltage signal as voltage required for cathodes in the display area of the organic electroluminescence display panel;
    or
    the power-supply circuit comprises a boost circuit, wherein the boost circuit is configured to produce a positive voltage signal as voltage required for anodes in the display area of the organic electroluminescence display panel; and wherein cathodes in the display area of the organic electroluminescence display panel are grounded.

12. The display device according to claim 11, wherein the power-supply circuit of the driver chip is further configured to power the display area of the organic electroluminescence display panel when the external compensation circuit determines compensation data according to the acquired parameters.

* * * * *